May 26, 1925.
C. C. FARMER
MAGNET CONTROLLING DEVICE
Filed March 13, 1923
1,538,931
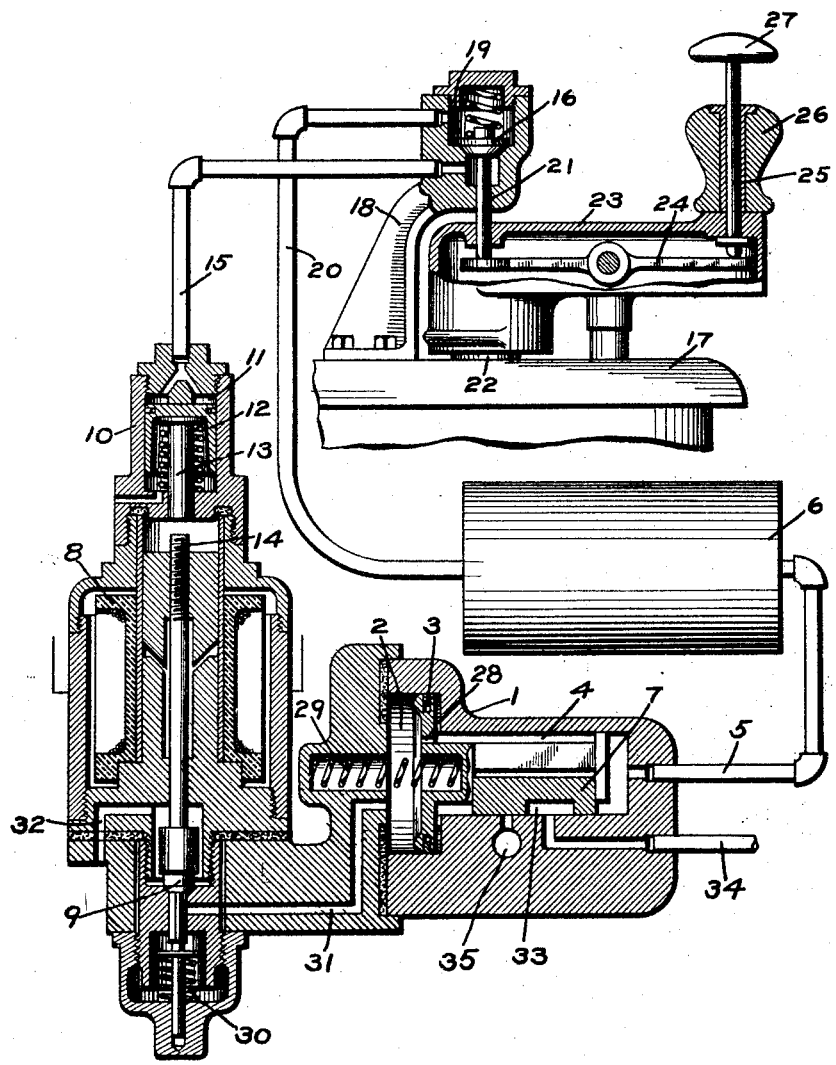
INVENTOR
CLYDE C. FARMER
BY *Wm. M. Cady*
ATTORNEY Patented May 26, 1925.

1,538,931

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

MAGNET-CONTROLLING DEVICE.

Application filed March 13, 1923. Serial No. 624,749.

*To all whom it may concern:*

Be it known that I, CLYDE C. FARMER, a citizen of the United States, residing at Pittsburgh, in the county of Allegheny and State of Pennsylvania, have invented new and useful Improvements in Magnet-Controlling Devices, of which the following is a specification.

The invention relates to magnet controlled valves, and more particularly as employed for controlling the brakes of a railway vehicle.

It has heretofore been proposed to provide a brake equipment for a railway train which is adapted to be controlled from a remote point such as by an operator stationed in a tower. Such an equipment is disclosed in Patent No. 1,339,680 of Walter V. Turner, dated May 11, 1920.

In the equipment disclosed in the above mentioned patent there is provided a brake application valve device and a magnet controlled valve for controlling the operation of the application valve device.

The magnet circuit is controlled from a tower or other remote point and this circuit is normally energized. When the circuit is deenergized by the towerman, the magnet controlled valve is operated so as to vent fluid under pressure from the application valve device and thereby cause an application of the brakes.

With an equipment of the above character, the current to the control magnet may be temporarily cut off as when the train passes over track crossings, so that the brakes would be applied by the consequent deenergization of the control magnet when such brake application is not intended nor desired.

The principal object of my invention is to provide means under the control of the operator on the locomotive for preventing the functioning of the control magnet under the above mentioned circumstances.

In the accompanying drawing, the single figure is a diagrammatic view, partly in section, of so much of a remote controlled brake equipment as is deemed necessary to illustrate the application of my invention, which is shown applied thereto.

In the drawing is shown a brake application valve device 1 comprising a casing having a piston chamber 2 containing a piston 3 and a valve chamber 4 connected by pipe 5 to a fluid pressure supply reservoir 6 and containing a slide valve 7 adapted to be operated by piston 3. Associated with the application valve device 1 is a magnet 8 and a valve 9 for controlling the venting of fluid from piston chamber 2. According to my invention, the magnet cap 10 is provided with a piston chamber 11 containing a piston 12 and said piston is adapted to operate a pin 13 in alinement with the valve stem 14 of the valve 9.

The piston chamber 11 is connected by a pipe 15 to a means for varying the fluid pressure in said chamber and preferably said means may comprise a valve 16 associated with an electric controller 17 which is employed to control the electric power of the electric locomotive which operates the train. The valve 16 may be mounted in a bracket member 18 having a chamber 19 containing the valve 16 and connected by pipe 20 to the fluid pressure supply reservoir 6.

The valve stem 21 of valve 16 extends downwardly in vertical alinement with the usual controller shaft 22 to which the controller handle 23 is connected. Said handle is provided with an opening through which the stem 21 extends and the hollow interior of the handle contains a pivoted lever 24. The valve stem 21 engages one end of the lever 24 and the other end of said lever is engaged by a pin 25 which extends through the handle knob 26 and which is provided at the outer end with a push button 27.

In operation, the valve chamber 4 is charged with fluid under pressure from the reservoir 6 and fluid flows from said chamber through a restricted port 28 in piston 3 to the piston chamber 2. The magnet 8 being normally energized, the valve 9 is held seated and fluid pressure in piston chamber 2 then equalizes with the pressure in chamber 4, permitting the spring 29 to maintain the piston 3 in its normal release position.

When the towerman opens the circuit of the magnet 8, the deenergization of the magnet permits the valve 9 to be opened by the spring 30, so that fluid under pressure is vented from piston chamber 2 through passage 31 to the atmosphere exhaust port 32. The piston 3 is then operated to shift the slide valve 7 so that cavity 33 connects brake pipe 34 with an exhaust port 35. Fluid under pressure is thus vented from the brake pipe to effect an application of the brakes in the usual well known manner.

If, for any reason, such as when the train passes over track crossings, the circuit of magnet 8 should be opened when it is not intended or desired that an application of the brakes should be effected, the operator on the train can prevent the operation of the magnet valve 9 by pressing the button 27. This operates through the lever 24 to open the valve 16, so that fluid under pressure is supplied from reservoir 6 to the piston chamber 11. The piston 12 is then operated to cause the pin 13 to engage the end of the valve stem 14 and thus prevent the opening of the valve 9, so that a brake application will not be caused.

When the valve 16 is allowed to return to its seat, any fluid pressure remaining in piston chamber 11 will escape to the atmosphere around the stem 21 of the valve 16.

Having now described my invention, what I claim as new and desire to secure by Letters Patent, is:—

1. The combination with a valve device for effecting an application of the brakes, of a magnet, a valve operated upon deenergization of said magnet for effecting the operation of said valve device, and means under the control of an operator for preventing the movement of said valve upon deenergization of said magnet.

2. The combination with a magnet and a valve adapted to be opened upon deenergization of said magnet, of a piston operated by fluid under pressure for preventing the opening of said valve and means for controlling the admission of fluid pressure to said piston.

3. The combination with a magnet and a valve adapted to be opened upon deenergization of said magnet, of a piston operated by fluid under pressure for preventing the opening of said valve, an electric controller handle, a valve associated with said handle for controlling the fluid pressure on said piston, and means carried by said handle for controlling the operation of said valve.

4. The combination with a valve device operated by venting fluid under pressure therefrom for effecting an application of the brakes, of a magnet, a valve operative upon deenergization of said magnet for venting fluid under pressure from said valve device, a piston operated by fluid under pressure for preventing the operation of said valve, an electric controller handle, and manually operable means associated with said controller handle for controlling the fluid pressure on said piston.

In testimony whereof I have hereunto set my hand.

CLYDE C. FARMER.